(12) United States Patent
Palmberg, Jr.

(10) Patent No.: US 6,217,123 B1
(45) Date of Patent: Apr. 17, 2001

(54) DUMP VEHICLE WITH A POSITIVELY CONTROLLED OPENING GATE

(76) Inventor: William C. Palmberg, Jr., 499 Ridge Dr., Gearhart, OR (US) 97138

( * ) Notice: Subject to any disclaimer, the term of this patent is extended or adjusted under 35 U.S.C. 154(b) by 0 days.

(21) Appl. No.: 09/283,707

(22) Filed: Apr. 1, 1999

Related U.S. Application Data

(63) Continuation of application No. 08/979,131, filed on Nov. 26, 1997, now Pat. No. 5,890,770.

(51) Int. Cl.⁷ .................................................. B60P 1/26
(52) U.S. Cl. ............................ 298/23 MD; 298/23 M; 296/51
(58) Field of Search ........................... 298/23 R, 23 MD, 298/23 M, 23 S, 23 D; 296/51, 50, 52, 56

(56) References Cited

U.S. PATENT DOCUMENTS

| | | |
|---|---|---|
| 1,480,081 | 1/1924 | Klomhaus . |
| 1,742,058 | 12/1929 | Coppock . |
| 2,440,733 | 5/1948 | Blair . |
| 2,635,688 | 4/1953 | Bruning . |
| 3,094,359 | 6/1963 | Biszantz et al. . |
| 3,361,476 | 1/1968 | Smock . |
| 3,548,540 | 12/1970 | Cullings . |
| 4,067,466 | 1/1978 | Parks et al. . |
| 4,352,624 | 10/1982 | Matsumoto . |
| 4,699,428 | 10/1987 | Vick ................ 298/23 MD |
| 4,723,817 | 2/1988 | Wallan ............. 298/23 MD |
| 4,989,918 | 2/1991 | Biddy .............. 298/23 MD |
| 5,288,137 | 2/1994 | Henry .............. 298/23 DF |
| 5,407,251 | 4/1995 | Ritchie, II et al. ... 298/23 MD |
| 5,527,098 | 6/1996 | McKinney et al. .. 298/23 MD |
| 5,890,770 | * 4/1999 | Palmberg, Jr. ...... 298/23 MD |

* cited by examiner

*Primary Examiner*—Stephen T. Gordon
(74) *Attorney, Agent, or Firm*—Kolisch, Hartwell, Dickinson, McCormack & Heuser

(57) ABSTRACT

A dump vehicle with a positively controlled opening gate is disclosed. The vehicle includes a frame, a dump bed mounted on the frame and having a floor, front and side walls and a rear opening through which material can be discharged from the bed, and a gate having a pair of lateral edges and a lower edge. The gate is pivotally mounted adjacent the rear opening and has a closed position in which the gate blocks the rear opening to prevent discharge from the bed through the rear opening. The vehicle further includes a gate control mechanism connected to the gate. The gate control mechanism is adapted to selectively raise the gate from the closed position to allow metered discharge of material or to release the gate from the closed position so that the gate may pivot away from the rear opening to allow unmetered discharge of material.

14 Claims, 5 Drawing Sheets

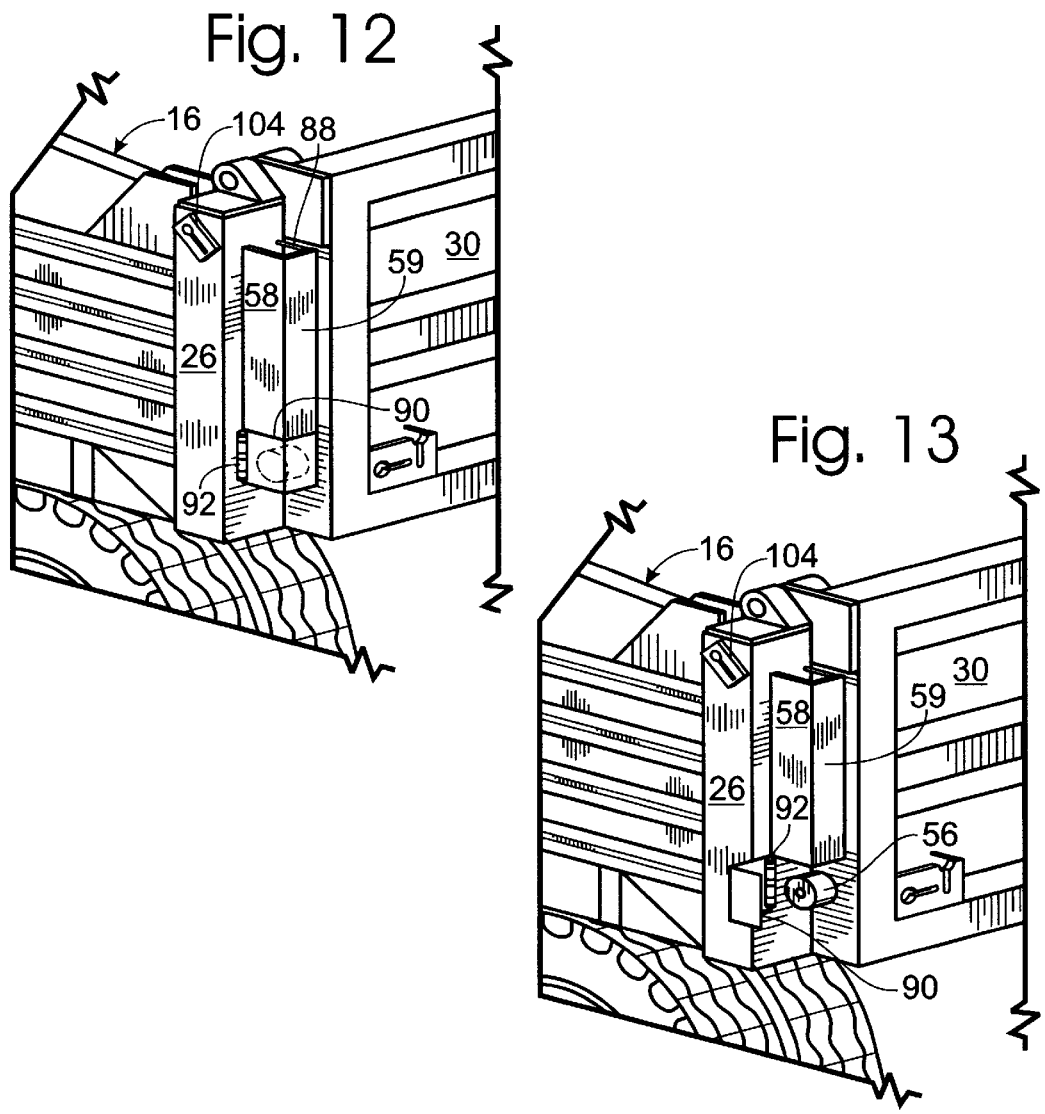

DUMP VEHICLE WITH A POSITIVELY CONTROLLED OPENING GATE

CROSS REFERENCE TO RELATED APPLICATIONS

This application is a continuation of and claims priority to U.S. patent application Ser. No. 08/979,131 of William C. Palmberg, Jr., filed Nov. 26, 1997, and issued on Apr. 6,1999 as U.S. Pat. No. 5,890,770 the disclosure of which is hereby incorporated by reference.

FIELD OF THE INVENTION

The present invention relates generally to dump vehicles, such as dump trucks, and more particularly to a dump vehicle with a positively controlled opening gate.

BACKGROUND AND SUMMARY OF THE INVENTION

A conventional dump vehicle includes a frame mounted on wheels and a bed that is configured to hold a volume of material to be transported and eventually dumped, such as gravel, sand, asphalt, etc. Via a hydraulic lifting mechanism, the bed is able to be inclined or "tipped" with respect to the frame to urge any material contained therein to be dispensed through the bed's discharge port, which is usually a rear opening. Dump vehicles of this type also include a gate that is pivotally coupled to the bed and is pivotal from a closed position, in which the gate closes the opening and prevents material from passing there through, and a pivoted position, in which the gate is swung away from the bed and allows material to be freely dispensed through the opening.

The gate is retained in its closed position by a pair of pivotal latches, or dogs, that extend over a pair of tabs, one extending outwardly from each lateral edge of the gate, to retain the gate against the rear portion of the bed. When the dogs are actuated, they pivot generally upwardly and away from the tabs to release the tabs and enable the gate to pivot outwardly from bed, thereby allowing the material contained therein to be dispensed through the rear opening. When the gate is in this pivoted position, the material in the bed may be dumped out of the bed simply by inclining the bed with respect to the frame. The material is dispensed rather quickly, in an unmetered fashion, through the opening and onto the ground or other surface proximate the vehicle.

Unfortunately, it is extremely difficult, although often necessary, to control the rate at which the material is dispensed. The speed of the vehicle, the angle of the bed with respect to the frame, and the viscosity of the material contained within the bed are factors which affect the rate at which material is dispensed from the gate and onto the ground. None of these factors, however, whether considered alone or collectively, enable sufficient control of the flow rate of material from the bed.

With the conventional dump vehicle described above, a chain is often used to attempt to control the degree to which the gate may pivot away from the rear opening, thereby controlling the rate at which material is dispensed from the bed. One end of the chain is secured to the frame or bed, and the chain is secured to the gate a specified distance from the secured end. By selecting a particular length of chain, usually a certain number of links, between the gate and the bed, the user is able to set a maximum angle at which the gate can pivot away from the bed. Unfortunately, this is a very rough measurement that lends itself to considerable guessing and speculation on the part of the user. Moreover, if the user guesses incorrectly, it is not possible to readjust the measurement. Similarly, it is not possible to adjust the measurement if the desired flow rate changes. Instead, once the material has begun to flow out of the rear opening, it will generally have sufficient weight to prevent the tailgate from being returned to the closed position until all, or at least most, of the material has been dispensed from the bed. It should be understood that this is not, as used herein, metered discharge of the material from the bed. While an upper limit to the flow rate of material from the bed may be established, the flow rate may not be adjusted or stopped.

Furthermore, once a flow of material from the bed has begun, it is not possible to stop the flow quickly, and often times is only possible after a majority of the material has been dispensed. At best, the bed can be returned to its most level position, and the material will continue to flow out of the opening until the outward force exerted on the pivoted gate by the material is less than the opposite force exerted by the gate on the material. Even when these forces are in equilibrium, the gate often cannot be returned fully to its closed position because of material trapped between the opening and the gate. This is especially true when the material is asphalt or rock.

Therefore, with a conventional dump vehicle and tailgate, it is possible to dump all of the material at once, or to make a one-time estimate and hope that the selected angle produces the desired flow rate of material through the rear opening. In addition, even if the desired flow rate is obtained, it is not possible to stop the flow of material through the rear opening until most or all of the material has been dispensed. Moreover, the flow of material generally spans the entire length of the rear opening and may not be selectively dispensed over only a variable portion of the length of the opening.

One attempt to solve this problem is disclosed in U.S. Pat. No. 4,989,918 to Biddy, which is entitled "Material Handling Vehicle with Improved Tailgate," the disclosure of which is hereby incorporated by reference. Biddy discloses a dump truck with a tailgate that may be raised with respect to the bed by a pair of hydraulic lifting members and subsequently pivoted outwardly from the bed. The truck includes a pair of channels extending upwardly from adjacent the floor of the bed into which the tabs on each side of the tailgate are retained until the gate is raised a defined distance above the floor of the bed. When the tabs are within the channels, the gate may be selectively raised or lowered to control flow of material through the rear opening of the bed. Once the gate is raised to a height at which the tabs are higher than the channels, the gate is free to swing outwardly from the bed for unmetered, or uncontrolled, dumping of the material through the rear opening.

The drawback to this design, however, is that the vehicle of Biddy does not enable the gate to, from a closed position, be either pivoted or raised with respect to the bed. Instead, the gate must always be raised, from a closed position, to a height that exceeds the height of the channels. Only at this point may the gate be pivoted with respect to the bed. Therefore, if the user desires to quickly dump the material contained within the bed, the user must wait while the gate is raised a distance equal to the height of the channels before the gate may swing outwardly from the bed.

An additional problem with the design of Biddy is that the system is entirely dependent upon the operation of the hydraulic lifting members. If either of the members fails or malfunctions, the gate is locked in its current position, and the truck is inoperable for its intended purpose until the member is repaired. For example, if either of the hydraulic members or the system providing power and fluid to the members fails when the gate is in its closed position, the gate is locked in this position, with the tabs firmly retained within the channels. Even if the lifting members could be disengaged, the gate would have to be manually raised to allow the material within the bed to be removed. In most applications, the weight of the material within the bed would make the process extremely difficult and time-consuming.

Another disadvantage is that the distance through which the gate may be raised and returned to a closed position is directly proportional to the time it takes to pivot the gate away from the bed. For example, if the channels are fairly long, then the user has a wide range of heights at which the level of the gate with respect to the bed may be positively controlled. However, the gate must be raised through this entire height in order to pivot the gate away from the bed. On the other hand, if the channels are relatively short, the gate may be raised more quickly to a sufficient height to be pivoted away from the bed, but the user will have a much more limited range of heights at which the elevation of the gate may be positively controlled. Therefore, there is a constant tradeoff between the time to pivot the gate away from the bed and range of heights within which the elevation of the gate may be positively controlled.

A further disadvantage of the vehicle disclosed in Biddy is the position of the channels with respect to the floor of the bed. Because the channels extend from below the floor of the bed and have internally oriented openings extending along their entire length, material dispensed from the bed will always be prone to being received within the channels. When the transported and dumped material is compressible and easily removed, this may be more of a recurring inconvenience than a serious disadvantage. When the material is substantially incompressible, such as rock or gravel, then any of the material that is received within either of the channels may prevent the gate from being returned fully to its closed position. It should be understood that if the gate cannot be returned to its closed position, then the discharge port or opening of the vehicle will not be closed fully, thereby allowing material to continuously flow out of the opening until the obstruction is removed. Furthermore, to remove the obstruction, the gate would most likely have to be raised with respect to the floor of the bed, thereby increasing the available size of the opening and allowing even more material to be dispensed and possibly introduced into the channels.

Even more problems are encountered when the material hardens over time from a fluid or relatively amorphous state to a solid state. An example of such a material is asphalt. If this material is received and allowed to harden within the channels, it is possible to lock the gate in a given position because the tabs are stuck in that position by the hardened material. It is also possible that the material will harden within the channel and prevent the gate from being fully closed because the material will obstruct the lower or other portion of the channel. Therefore, if the vehicle is going to be used with this type of material, the channels and tabs must be continuously monitored for any build-up of hardened material.

Although Biddy attempts to address and satisfy some of the above-recited problems inherent in a conventional dump vehicle, it is an unsatisfactory solution to these problems, for at least the reasons discussed above. Accordingly, it is a primary object of the present invention to provide a dump vehicle with a gate that may, from a closed position, be selectively pivoted away from the bed or raised with respect to the bed to respectively allow unmetered or metered discharge of material from the bed.

Another object of the invention is to provide such a vehicle with a dual-control mechanism that uses separate sets of mechanisms to cause the gate to be raised and to be pivoted with respect to the bed.

Still another object of the present invention is to provide a positively controlled tailgate system that may be easily and quickly retrofit on an existing dump vehicle.

Yet another object of the present invention is to provide such a system which utilizes a substantial amount of the existing components of the vehicle.

One more object is to provide such a vehicle and system that are durable and able to sustain the abuses encountered in their operating environment, while still being easy to maintain and requiring minimal maintenance.

Another object is to provide for selective control of the width, as well as the height, of the discharge port from the bed.

The invention achieves these and other objects and advantages in the form of a dump vehicle with a positively controlled opening gate. The vehicle includes a frame, a dump bed mounted on the frame and having a floor, front and side walls and a rear opening through which material can be discharged from the bed, and a gate having a pair of lateral edges and a lower edge. The gate is pivotally mounted adjacent the rear opening and has a closed position in which the gate blocks the rear opening to prevent discharge from the bed through the rear opening. The vehicle further includes a gate control mechanism connected to the gate. The gate control mechanism is adapted to selectively raise the gate from the closed position to allow metered discharge of material or to release the gate from the closed position so that the gate may pivot away from the rear opening to allow unmetered discharge of material.

These and other advantages and features of the invention will become more fully apparent as the detailed description below is read with reference to the accompanying drawings.

BRIEF DESCRIPTION OF THE DRAWINGS

FIG. 12 is a fragmentary side elevation view of the vehicle of FIG. 1 showing an alternate embodiment of the positively controlled opening gate system, with the gate in the closed position.

FIG. 13 is a fragmentary side elevation view of the vehicle of FIG. 12 with the system actuated to permit the gate to pivot away from the bed.

FIG. 14 is a rear elevation view of an alternate embodiment of the vehicle of FIG. 7 with the gate in a raised position.

DETAILED DESCRIPTION OF THE PREFERRED EMBODIMENTS

Figure 1:
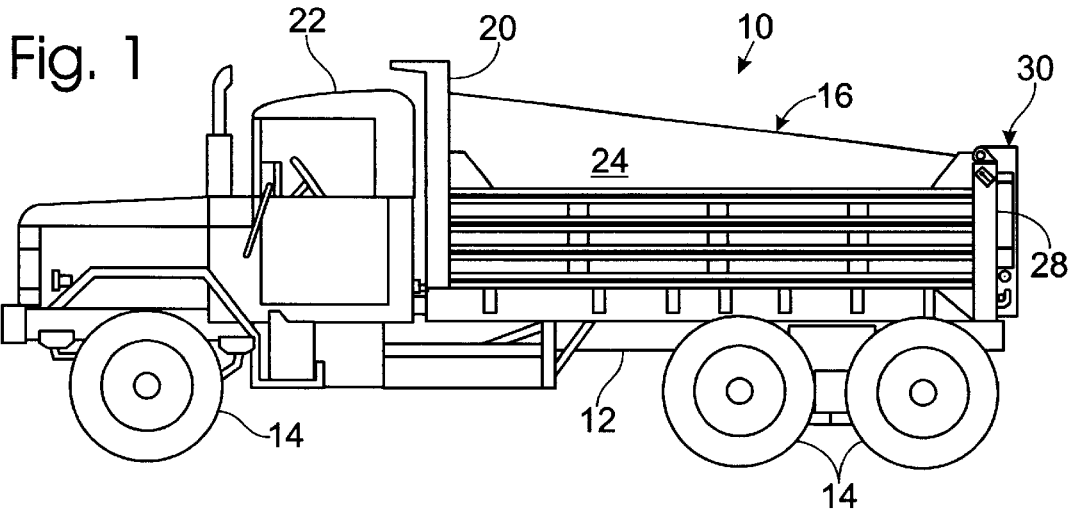
FIG. 1 is a side elevation view of a dump vehicle with a positively controlled opening gate system constructed according to a preferred embodiment of the invention, with the gate shown in its closed position.
Figure 2:
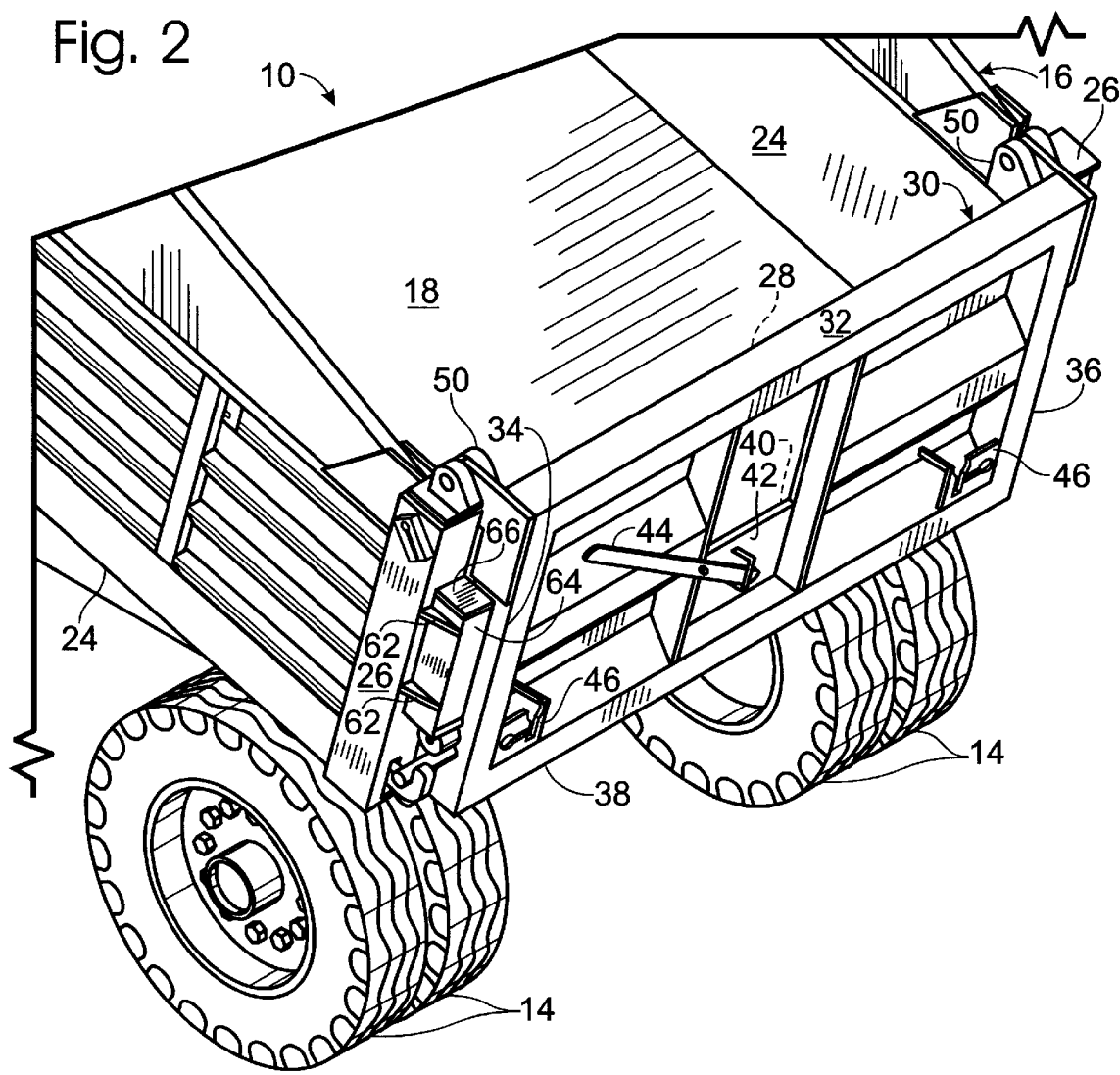
FIG. 2 is a rear isometric view of the vehicle of FIG. 1 with the bed in a tipped position and the gate in the closed position.

A dump vehicle constructed according to a preferred embodiment of the present invention is shown in FIGS. 1 and 2 and indicated generally at 10. Vehicle 10 includes a frame 12, which is mounted on wheels 14, and a bed 16 which is pivotally mounted on the frame. The bed includes a floor 18, with a front wall 20, which is typically adjacent the cab 22 of the vehicle. A pair of laterally spaced side walls 24 extend rearwardly from front wall 20, and each have a rearward portion or support 26 that collectively define the bed's rear opening 28, through which material may be dispensed from the bed. Supports 26 may be integrally formed with the corresponding side wall, or may be subsequently attached to the side wall. A hydraulic lift system (not shown) is mounted on frame 12 and selectively causes the front portion of bed 16 to be raised at an angle with respect to the frame, thereby causing the bed to be inclined downwardly as it extends toward the rear opening.

Vehicle 10 further includes a tailgate (also herein referred to as a gate) 30, which is pivotally mounted on the upper portion of each support 26. In its closed position, shown in FIG. 2, gate 30 spans the distance between supports 26 to close rear opening 28 and prevent material from being able to flow through the opening. As shown in FIG. 2, gate 30 has an upper edge 32, a pair of lateral edges 34 and 36, and a lower edge 38. Gate 30 is pivotally coupled to the upper portion of each support 26 and may be pivoted away from the opening to permit material to flow through the opening and out of the bed.

In the embodiment of gate 30 shown in FIG. 2, the gate further includes an internal port 40 with a door 42 that may be used to discharge a smaller, localized flow of material from the gate. A lever 44 is used to slide door 42 upwardly and downwardly to adjust the size of the discharge opening of port 40. As used herein, discharge opening refers to the portion of an opening or passage that is not blocked by a door, gate or other obstruction, and through which material may flow. It should be understood that the gate may be formed without port 42, or that port 42 may be formed in a lateral position on the gate instead of the central position shown in FIG. 2.

Also shown on gate 30 are a pair of sockets 46, which are adapted to receive a chain or other linkage to selectively limit the degree to which gate 30 may pivot or swing outwardly from opening 28. As discussed, a chain is conventionally coupled to the vehicle's frame or bed and selectively received and secured within one of the sockets 46 to prevent the gate from pivoting away from the opening more than a distance defined by the distance between the region of the chain coupled to the bed or frame and the region of the chain received within the socket. Preferably, a pair of chains are used, one adjacent each side of the bed, to provide equal support to each side of the gate and thereby reduce torsional forces on the gate, supports and the pivotal connection there between.

Vehicle 10 further includes a gate control mechanism that is adapted to selectively raise the gate from the closed position to allow metered discharge of material or to release the gate from the closed position so that the gate may pivot away from the rear opening to allow unmetered discharge of material. The gate control mechanism includes two primary components, namely a lift mechanism and a gate release mechanism.

The lift mechanism selectively raises and lowers the gate with respect to the floor of the bed. Furthermore, once the gate is raised above the closed position shown in FIGS. 1–3, the lift mechanism prevents the gate from pivoting away from the rear opening. When lower edge 38 of gate 30 is raised above floor 18 of bed 16, the gate defines a discharge opening 54 (shown in FIGS. 4–5) through which material may flow out of the bed. Once a desired flow of material has been dispensed, the lift mechanism further enables the user to quickly and easily return the gate to the closed position and thereby stop the flow of material from the bed. The lift mechanism enables the flow of material to be stopped, regardless of the angle of the bed with respect to the horizontal or the specific type of material transported in the bed. Furthermore, this positive control of the height of the gate above the floor of the bed enables the user to control and adjust the vertical component, or size, of the discharge opening to regulate the flow of material from the bed. Therefore, if the user's initial estimate as to the correct size for the discharge opening is incorrect, or if the necessary flow rate changes, the opening can be easily and quickly enlarged, reduced, or completely closed.

The gate release mechanism, on the other hand, engages the gate when it is in the closed position and selectively releases, or frees, the gate to pivot away from the opening. Therefore, if the user desires to dump all of the material in the bed very quickly, in an unmetered fashion, then the gate release mechanism may be actuated to release the gate and enable it to pivot away from the rear opening. By tipping the bed prior or after releasing the gate, the flow rate of the material through rear opening 28 may be increased.

From the closed position of the gate, the lift mechanism and the gate release mechanism provide independent controls for the gate's position. Therefore, from this closed position, the user can selectively raise the gate or free the gate to pivot away from the rear opening. Furthermore, if either mechanism is damaged or fails, the user is still able to use the other to remove the material from the bed. Thus the invented system provides an added level of security to the user, who knows that material in the bed will be able to be dispensed from at least one of two available discharge mechanisms, if not both.

The controls for the gate control mechanism preferably are located both inside the vehicle's cab, where they may be controlled by the driver of the vehicle, and on or adjacent the vehicle's bed so that they may be controlled by a user walking next to the vehicle. One method of housing this latter set of controls is to put the controls on a control box with is tethered to the vehicle by a length of tubing or cables so that the user is free to roam a certain distance from the bed. Preferably the controls include a selector switch so that the user may select either the lift mechanism or the gate release mechanism.

Figure 3:
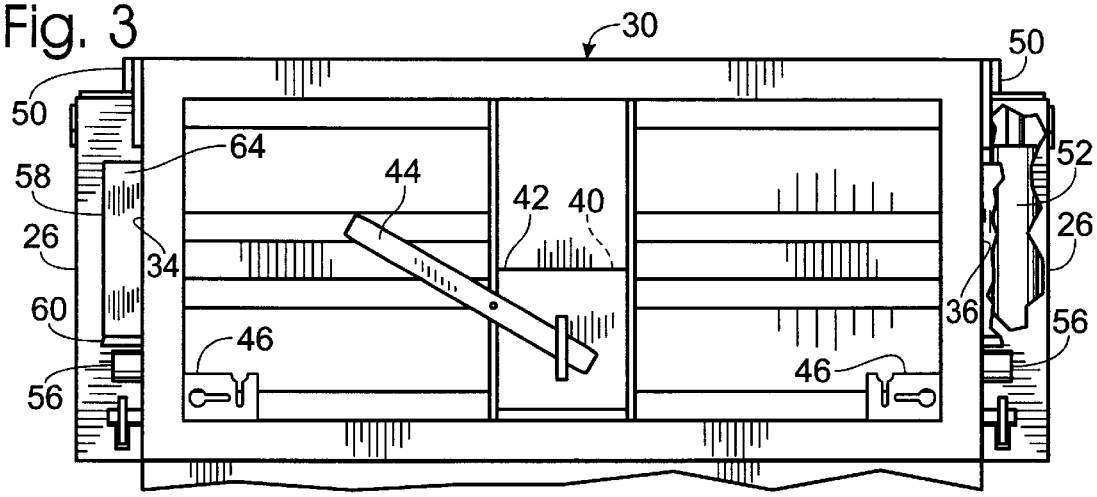
FIG. 3 is a rear elevation view of the vehicle of FIG. 1 with the bed in the closed position.
Figure 4:
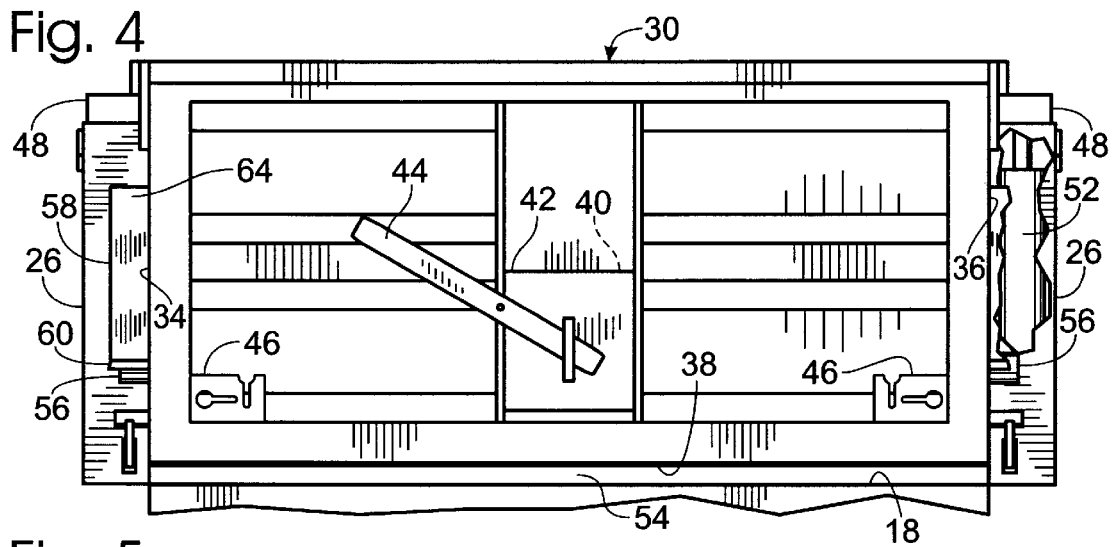
FIG. 4 is a rear elevation view of the vehicle of FIG. 3 with the gate in a raised position where it defines a discharge opening between the lower edge of the gate and the floor of the bed.
Figure 5:
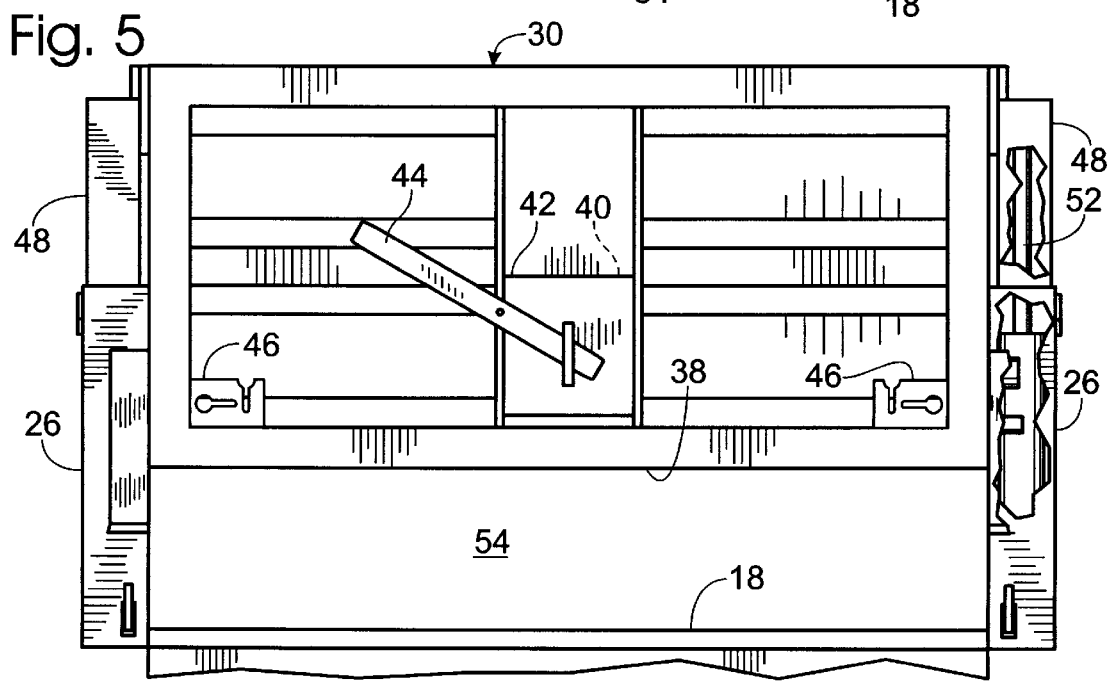
FIG. 5 is a rear elevation view of the vehicle of FIG. 3 with the gate in a higher raised position than shown in FIG. 4.

In FIGS. 3–5, the vehicle's lift mechanism is illustrated. As shown, each support includes an extension 48 that selectively extends above the rest of the support in the direction of the long axis of the support. Gate 30 is pivotally mounted on each extension 48 by a hinge mechanism 50, which enables the gate to pivot away from the rear opening, unless something retains the gate against the opening, such as the lift and gate release mechanisms. As shown, each extension 48 telescopes within its corresponding support 26. It is within the scope of the present invention, however, that the extensions may telescope outside of the supports, or that the extensions may be mounted alongside the supports.

Each support 26 further includes a hydraulic unit 52 that is coupled to extension 48 and frame 12, bed 16 or a lower portion of support 26 and which, when actuated, raises or lowers the corresponding extension with respect to the floor of the bed. As shown, extensions are raised tangential to bed 18, however, the supports may be inclined with respect to the bed, resulting in extensions that are raised at an angle with respect to the bed. Hydraulic units 52 may be of a conventional design, however, they should be able to raise the weight of the gate even when there is a substantial quantity of material pressing or weighing against the gate, such as when the bed is tipped and the material is very heavy and dense. Furthermore, the units should be able to return the gate to the closed position once a flow of material has started.

A benefit of having the hydraulic units housed within the supports is that they are protected from coming in contact with the material being carried within the bed and dispensed through rear opening 28. This not only increases the life of the units, but also reduces the amount of maintenance and cleaning or servicing required by the units. It should be understood that the hydraulic units are in communication with the other components of a conventional hydraulic system, such as a pump, supply line, reservoir and motor, which may be mounted beside or beneath the vehicle's frame. Alternatively, the units may be tied into the vehicle's main hydraulic system, which is used to control the angle of the bed.

As shown in FIGS. 3–5, gate 30 further includes a pair of lugs 56 that extend outwardly from the gate's lateral edges 34 and 36. Furthermore, each support 26 includes a channel 58 that extends generally rearwardly from the corresponding support 26. Each channel 58 includes a rear surface 59 that defines a track along which lug 56 may travel as the gate is raised and lowered with respect to the floor of the bed. In FIG. 3, gate 30 is shown in its closed position. As shown, each lug 56 is free from engagement with its corresponding channel 58. In FIG. 4, the gate is slightly raised above the closed position, as indicated by the portion of extensions 48 visible in FIG. 4, and by the discharge opening 54 between the lower edge of the gate and the floor of the bed. In FIG. 5, gate 30 is raised to a height above floor 18 that is much higher than the corresponding height shown in FIG. 4, thereby producing a discharge opening 54 that is much larger than the opening shown in FIG. 4.

Preferably, each lug 56 is rotatable about an axis perpendicular to the long axis of the channels. This enables lugs 56 to roll as they travel within channels 58, which reduces the friction between the lugs and the channels. For example, lugs 56 may be formed from steel or another extremely durable and strong material, with a central aperture that houses an oil-impregnated bronze bushing and receives a large pin or bolt to secure the lug to the gate. It should be understood that any reduction in friction between the lugs and the channels reduces the amount of force necessary to raise and lower the extensions (and the gate), especially when the bed is tipped and a substantial weight of material is pressing against the gate. The friction between the lugs and the channels may be further reduced by coating rear surfaces 59 with a friction reducing coating, such as teflon. Oil, grease or other lubricants may be used as well, however, a permanent coating is preferred because it requires less maintenance.

As shown by referring briefly back to FIG. 2, one can see that channels 58 may further include a pair of braces or supports 62 that reinforce and provide support to the channels. Furthermore, the upper portion 64 of each channel preferably includes a stop 66 that prevents lugs 56 from passing upwardly through the upper portion and out of the channels. In FIG. 2, stop 66 closes the upper portion of the channels, and thereby also prevents dirt and other materials from getting in the channels from above. Furthermore, as shown in FIGS. 3–5, the lower portion 60 of each channel 58 is preferably flared outwardly to guide the lugs into the channel.

Figure 6:
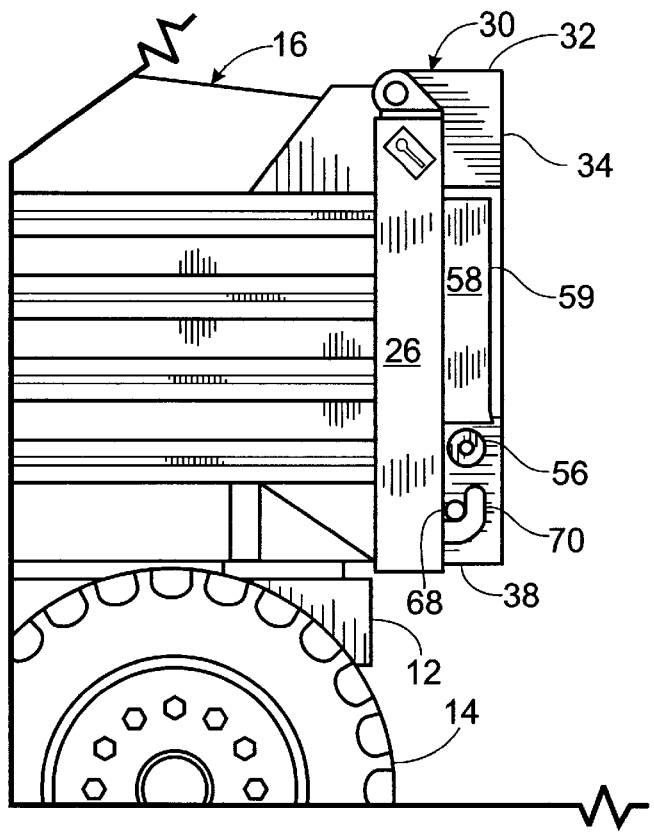
FIG. 6 is a fragmentary side elevation view of the vehicle of FIG. 1 with the gate in the closed position.
Figure 7:
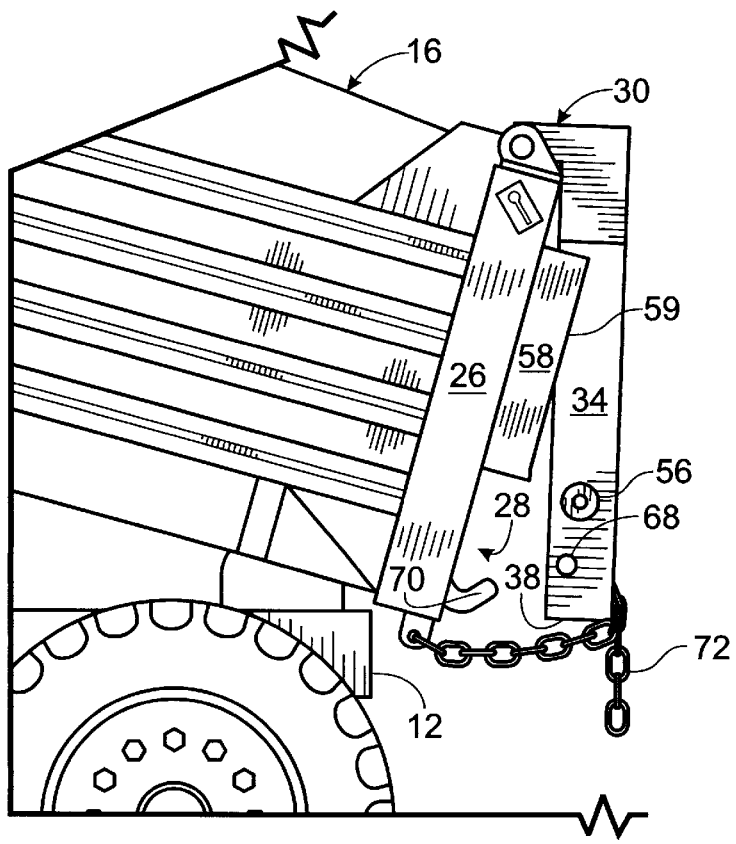
FIG. 7 is a fragmentary side elevation view of the vehicle of FIG. 6 with the bed tipped and the gate in a pivoted position.

As discussed, the gate control mechanism further includes a gate release mechanism, which is perhaps best seen in FIGS. 6 and 7. Gate 30 includes a second pair of lugs 68, which each extend outwardly beyond a respective one of the lateral edges 34 and 36 of the gate. Lugs 68 are each engaged by a pair of catches 70, which are selectively actuated to engage or release lugs 68. In FIG. 6, gate 30 is in the closed position, and lug 68 is engaged by catch 70. In this non-actuated or closed position, catch 70 engages lug 68 and retains the lug against or proximate the rear opening, thereby preventing the gate from pivoting away from the rear opening. When the catches are actuated, as shown in FIG. 7, catch 70 pivots downwardly and frees lug 68, thereby permitting the gate to pivot away from the opening. Catches 70 are preferably linked to the air-actuated, over-center locking system that controls the dogs of a conventional dump vehicle. It is intended that other systems may be used to actuate the catches and to cause the extensions to be raised and lowered, and such systems are within the scope of the present invention as long as they meet the criteria described herein.

The primary difference between a conventional dog and catch 70 is that catch 70 is positioned and sized so that as gate 30 is raised with respect to the bed, lug 56 is received within channel 58 before lug 68 is freed from engagement with catch 70, as in more discussed subsequently. Furthermore, because the lift mechanism raises the gate, and thereby raises lug 68, with respect to the floor of the bed, catch 70 must be inverted with respect to a conventional dog to enable this raising and lowering of the gate. Because a conventional dog extends over the top of lug 68, it would prevent gate 30 from being raised with respect to the floor.

Also shown in FIG. 7 is a chain 72 that is attached to support 26 at one end and coupled to one of sockets 46 (shown in FIGS. 2–5) to restrict the degree to which the gate may pivot rearwardly away from the opening. As discussed, this provides only marginal control to the flow rate of material out of the bed. Because of the dual control system of the present invention, chain 72 and sockets 46 are rendered obsolete because the invention provides precise, fully adjustable control of the size of the discharge opening. When retrofitting the invented gate control system on an existing vehicle, however, the chain and sockets may be retained for use if the lift mechanism should ever fail.

It is important to notice the placement of lug 56 with respect to lug 68. As gate 30 is raised from the closed position, it is important that lug 56 is received within the corresponding channel 58 before the gate is raised to a height at which lug 68 is freed from engagement with catch 70. As shown in FIG. 4, from the closed position, this placement enables the user to selectively raise and lower the gate or to release the gate to pivot away from the rear opening. It should be understood that the position of lug 56 and channel 58, and the position of lug 68 and catch 70, are not fixed, but should correlate with each other as discussed above.

Figure 8:
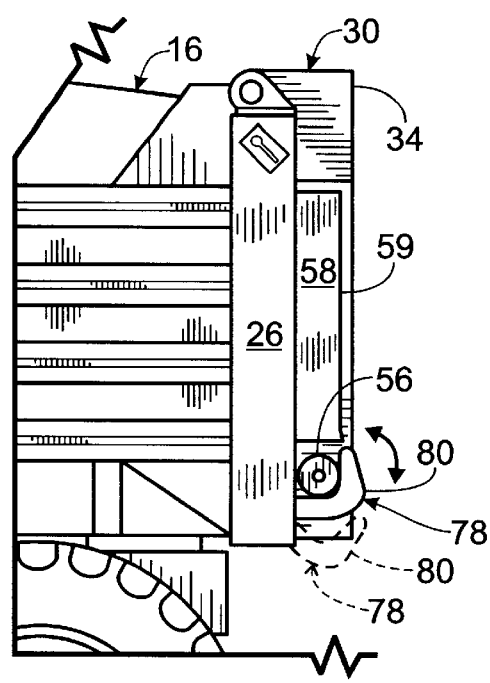
FIG. 8 is a fragmentary side elevation view of the vehicle of FIG. 1 showing an alternate embodiment of the positively controlled opening gate system, with the gate in the closed position.
Figure 9:
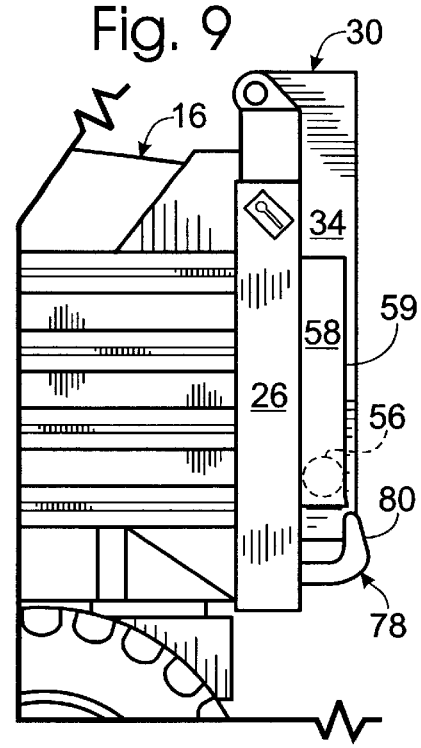
FIG. 9 is a fragmentary side elevation view of the vehicle of FIG. 8 with the gate in a raised position.

An alternate embodiment of the invented gate control system is shown in FIGS. 8 and 9. Unless otherwise specified, all alternate embodiments described herein include the same elements and subelements as the primary embodiment discussed above. Similarly, it should be understood that the invented positively controlled gate system is symmetrical. Therefore, when only one side of the system is shown, such as with FIGS. 5–11, the other side contains the same elements and subelements.

The embodiment of the dump vehicle shown in FIG. 8 only requires a single lug 56 on each lateral edge 34 and 36 of the gate, instead of the previously discussed pair of lugs 56 and 68 on each edge. The other primary difference between this embodiment and the embodiment shown in FIGS. 1–7 is that the catches, one of which is indicated generally at 78 in FIG. 8, include a generally vertical portion 80 that extends to or near the lower portion of channels 58. In FIG. 8, gate 30 is in the closed position, and catch 78 is in its closed or non-actuated position, in which portion 80 is generally aligned with rear surface 59 of the channel. When gate 30 is raised with respect to the floor of the bed, lug 56 travels upwardly along portion 80 and into channel 68, as shown in FIG. 9. On the other hand, when gate 30 is in the closed position and catch 78 is actuated, as shown in dashed lines in FIG. 8, lug 56 is released by the catch, and gate 30 is free to pivot away from the rear opening.

This and the following embodiment are presently preferred over the embodiment shown in FIGS. 1–7 because they decrease the number of interacting parts, thereby decreasing the frictional force that must be overcome to raise the gate from the closed position. Specifically, the embodiments shown in FIGS. 7–13 include a single pair of lugs that are engaged and selectively released by the gate release mechanism's catches as well as being selectively raised along the catches and the channel by the lift mechanism. The friction force is further reduced when the pair of lugs are rollers, in that they are rotatable as they travel along the catches and the channels.

Figure 10:
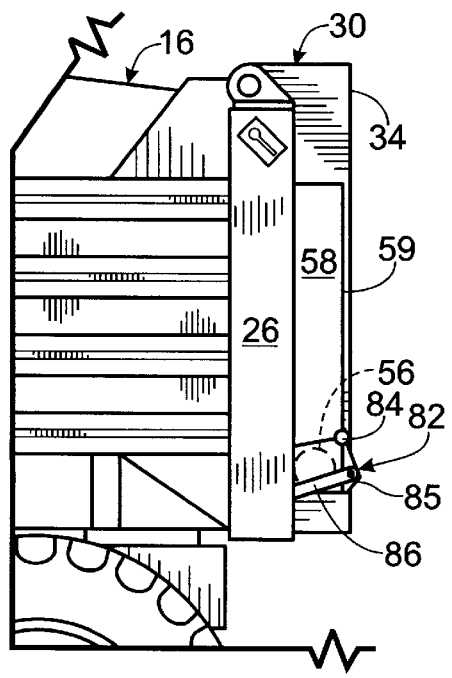
FIG. 10 is a fragmentary side elevation view of the vehicle of FIG. 1 showing an alternate embodiment of the positively controlled opening gate system, with the gate in the closed position.
Figure 11:
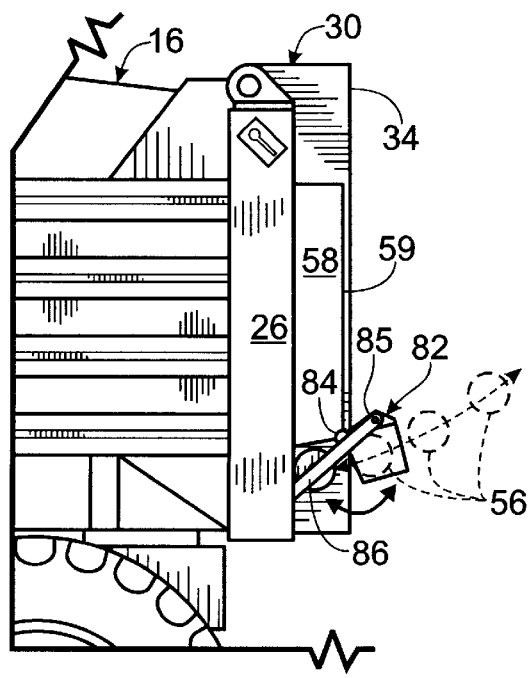
FIG. 11 is a fragmentary side elevation view of the vehicle of FIG. 10 with the system actuated to permit the gate to pivot away from the bed.

Another embodiment of the gate control system is shown in FIGS. 10 and 11. In this embodiment, the catches 82 are pivotally mounted at 84 to the corresponding channels 58 and pivot from a closed, vertical position shown in FIG. 10 to a rearwardly extended actuated position shown in FIG. 11. As shown, catch 80 generally conforms to the cross-sectional configuration of channel 58, and includes a rear surface 85 that engages lug 56 when gate 30 is in the closed position and prevents lug 56 and gate 30 from pivoting rearwardly away from the rear opening. Catch 80 further includes a linkage 86 that connects the catch to an actuator, such as the previously described air actuator. As shown, catch 80 also includes a lateral wall extending from rear surface 85 generally toward support 26. It is within the scope of the present invention that catch 80 could be built without this wall as well.

Yet another embodiment of the gate control system is shown in FIGS. 12 and 13. In this embodiment, the catches 90 are pivotally mounted on supports 26 at 92 and have a similar shape as the catch shown in FIGS. 10 and 11, although they are configured to pivot laterally and outwardly rather than rearwardly and upwardly. From the closed position shown in FIG. 12, catch 90 pivots laterally and outwardly, when actuated, to release lug 56 and enable the gate to pivot away from the closed position. It should be understood that catch 90 is linked to an actuator with a mechanical linkage such as shown in FIGS. 10 and 11. Another way to link catch 90 with an actuator is to have the portion of catch 90 that extends from support 26 to extend within the support, where it is coupled to an actuator and selectively pivotal between positions that are generally parallel and generally transverse to the gate. It should be understood that is this internal portion is pivoted, the rest of catch 90 is also pivoted between the closed position shown in FIG. 10 and the actuated position shown in FIG. 11. Also shown in FIGS. 10 and 11 is another stop 88, which reinforces the upper portion of channel 58.

As discussed, the invented positively controlled gate system enables the vehicle's gate to be selectively released from the closed position and allowed to pivot away from the closed position, or to be raised above the floor vehicle's bed to define a discharge opening between the lower edge of the gate and the floor of the bed. The vertical component of the discharge opening is adjustable within a range of distances above the closed position. The upper limit of the range of distances is defined by the stops in the channels, the maximum length of the hydraulic units, or the maximum of length of extensions 48 with respect to supports 26.

In some applications, however, it is desirable to control and adjust the horizontal component of the discharge opening. For example, sometimes the material contained with the bed is to be dispensed into a narrow trench or path. If the horizontal component of the discharge opening is not adjustable, then the material flows out of the entire width of the rear opening, resulting in the user having to manually position the material after it is dispensed. This substantially increases the time and effort needed to create a relatively narrow line of dispensed material, as well as to clean and move the material dumped outside of this desired region line.

To solve this problem, gate 30 preferably includes a plurality of sockets 98 extending in a spaced-apart relationship across lower edge 38 of the gate, as shown in FIG. 11. At least one baffle 100 is then secured to the gate by a plurality of bolts or other fasteners 102 that extend through the baffles and into the sockets. Baffles 100 extend downwardly from the surface of the gate that faces the bed to limit the horizontal component of the discharge opening as the gate is raised from the closed position. As shown in FIG. 11, a pair of baffles 100 are secured to the gate to produce a discharge opening limited to a relatively narrow region adjacent the right side of the bed. Because the sockets extend across the entire length of the gate, baffles 100 may be secured to the gate anywhere along its length, thereby defining one or more discharge openings with horizontal components extending between the supports and the baffle or baffles, or between adjacent baffles.

Baffles 100 preferably extend below lower edge 38 of gate 30 a distance at least as long as the maximum distance the gate may be raised above the floor of the bed. This way the user cannot raise the gate to a height greater than the height of the baffle, which would result in the horizontal component of the discharge opening suddenly increasing to the entire distance between the supports. Shorter baffles may be used, however, the user must be careful not to raise the gate to a height greater than the height of the baffle. It is within the scope of the present invention that baffles 100 could be secured to the forward or rearward surface of gate 30 as well, however in each of these configurations the baffles must be suitably shaped to prevent material from being discharged from the bed when the gate is raised. Therefore, because the rearward surface of the gate will most often extend rearwardly beyond the rear opening of the bed, a baffle secured to the rear surface would have to extend under the lower edge of the gate and further extend downwardly generally parallel to the internal surface of the gate, thereby producing a generally Z-shaped baffle. Securing the baffles to lower edge 38 of the gate is presently preferred, however, because sockets 98 are still readily accessible to a user, while being better protected from being damaged or filled with unwanted material.

When a new dump vehicle is constructed according to one of the preferred embodiments discussed above, any of the previously described gates and gate control systems may be used, depending on the user's tastes and preferences. One factor which may be considered is that it is sometimes desirable to be able to release the gate from hinge mechanisms 50 and lower the gate to a horizontal position. This adjustment is facilitated by a lower support, or pivot point, for the gate, as well as by an additional pair of sockets, which are mounted on the upper portion of supports 26 and indicated at 104 in FIGS. 12–14. Sockets 104 each receive a length of chain or another suitable linkage that extends from the upper portion of the lowered gate to the socket to support the lowered gate. In an embodiment of the vehicle that includes sockets 104, the bed should include a at least one pivot mounted on the frame or rear surface of the bed at the approximate height of the gate when it is in the closed position. Preferably, the pivots are stowable, in that they have a stowed position, in which they are out of the way during the normal use of the vehicle and gate system, and a use position, in which they engage the lower portion or edge of the gate and provide a pivot point about which the gate may be lowered to a horizontal position. It is also possible that such a pivot may be housed in supports 26 and selectively positioned to insert into or otherwise engage the lower portion of gate 30.

The invented system may also be fairly quickly retrofit on an existing dump vehicle, with minimal wasted parts. The most significant step is that the vehicle's rear supports must be removed and replaced with supports 26, which contain the previously described channels, hydraulic units and extensions. Also, the supply system for the hydraulic units must be added, or tied into the vehicle's main hydraulic system. After this initial replacement and installation of parts, substantially all of the remaining components of the existing system may be reused. As discussed, the actuator for the catches may be the air-actuated system that is currently used on most conventional systems. Therefore, the downwardly extending dogs of the conventional system should be removed and replaced with any of the previously described catches. Similarly, lugs 56 should be added to each lateral edge of the vehicle's existing gate. Depending on the type of catches selected, the original gate's tabs may have to be removed or repositioned.

If baffles 100 are to be used, the plurality of sockets 98 must be drilled in the lower edge of the gate. Finally, it may be desirable to include an indicator, such as is disclosed in Biddy, that indicates to a user the exact height to which gate 30 is raised above the lower surface of the bed. Compared to the considerable expense of purchasing or building a new dump vehicle, it can be seen that the cost of retrofitting a conventional dump vehicle to include the invented positively controlled gate system is relatively inexpensive, while offering considerable advantages and control not previously seen in a dump vehicle.

While the present invention has been shown and described with reference to the foregoing preferred embodiment, it is to be understood by those of skill in the art that other changes in form and detail may be made therein without departing from the spirit and scope of the invention as defined in the following claims.

I claim:

1. A gate system for use with a dump vehicle having a bed adapted to hold a volume of material, a floor and a pair of spaced-apart walls that define a rear opening therebetween through which the material may be discharged from the bed, the system comprising:

a pair of supports, each having an extension adapted to be raised within a defined range of distances above the bed;

a pair of channels, each mounted on a respective one of the supports and extending at least partially along the length thereof;

a gate pivotally mounted on the extensions and having an upper edge, a pair of lateral edges and a lower edge, wherein the gate has a closed position in which it closes the opening and prevents the discharge of material therethrough;

a pair of lugs, each mounted on a respective one of the lateral edges of the gate, wherein each of the lugs is received within a respective one of the channels when the gate is raised from the closed position, thereby preventing the gate from pivoting away from the opening;

a pair of catches selectively actuable from a first position, wherein the gate is prevented from pivoting away from the opening, and a second position, in which the gate is free to pivot away from the closed position; and a lift mechanism coupled to the supports to selectively raise and lower the extensions and the gate within the defined range of distances.

2. The system of claim 1, wherein the lift mechanism includes a pair of hydraulic units, each adapted to raise and lower a respective one of the extensions with respect to the floor of the bed.

3. The system of claim 2, wherein the system further includes a gate control mechanism that selectively actuates the hydraulic units to raise or lower the extensions and to selectively actuate the catches to engage or release the lugs when the gate is in the closed position.

4. The system of claim 1, wherein each of the channels includes a rear surface that prevents the gate from pivoting outwardly from the rear opening when the lugs are received within the channels and which defines a track along which the corresponding lug travels as the gate is raised and lowered with respect to the floor of the bed.

5. The system of claim 1, wherein the channels each have upper regions that include a stop that prevents the lugs from passing through the upper regions and out of the channels.

6. The system of claim 1, wherein the catches are pivotally coupled to the supports and pivot downwardly away from the supports when actuated to release the lugs and thereby free the gate to pivot away from the opening when in the closed position.

7. The system of claim 1, wherein the catches are pivotally coupled to the channels and pivot upwardly from the channels when actuated to release the lugs and permit the gate to pivot away from the rear opening when in the closed position.

8. The system of claim 1, wherein the catches are pivotally coupled to the channels and pivot outwardly from the channels when actuated to release the lugs and permit the gate to pivot away from the rear opening when in the closed position.

9. The system of claim 1, wherein the pair of lugs is a first pair of lugs and the system includes a second pair of lugs, with one of each pair of lugs mounted on each lateral edge of the gate, wherein the first pair of lugs are positioned to be selectively engaged by the catches and the second pair of lugs are positioned to be received within the channels when the gate is raised from the closed position.

10. The system of claim 1, wherein the opening includes a horizontal component measured between the supports and parallel to the floor and a vertical component measured transverse to the floor, and further wherein the gate includes a baffle that extends downwardly from the gate to restrict the size of the horizontal component of the opening through which material may flow when the gate is raised from the closed position.

11. The system of claim 10, wherein the baffle is selectively sizable to enable a user to adjust the size of the horizontal component of the opening through which material may flow when the gate is raised from the closed position.

12. The system of claim 10, wherein the gate includes a plurality of spaced-apart sockets to which the baffle is adjustably and removably mounted.

13. The system of claim 1, wherein the opening includes a horizontal component measured between the supports and parallel to the floor and a vertical component measured transverse to the floor, and further wherein the gate includes baffle means that enable a user to restrict the size of the horizontal component of the opening through which material may flow when the gate is raised from the closed position.

14. The system of claim 1, wherein the lugs are free from engagement with the channels when the gate is in the closed position.

* * * * *